Oct. 30, 1962  R. F. VAN HORN  3,061,050
WHEEL AND BRAKE ASSEMBLY
Filed Sept. 3, 1958  3 Sheets-Sheet 1

INVENTOR.
RUSSELL F. VAN HORN
BY  John D. Haney
ATTY.

Oct. 30, 1962  R. F. VAN HORN  3,061,050
WHEEL AND BRAKE ASSEMBLY
Filed Sept. 3, 1958  3 Sheets-Sheet 2

INVENTOR.
RUSSELL F. VAN HORN
BY
John D. Haney
ATTY.

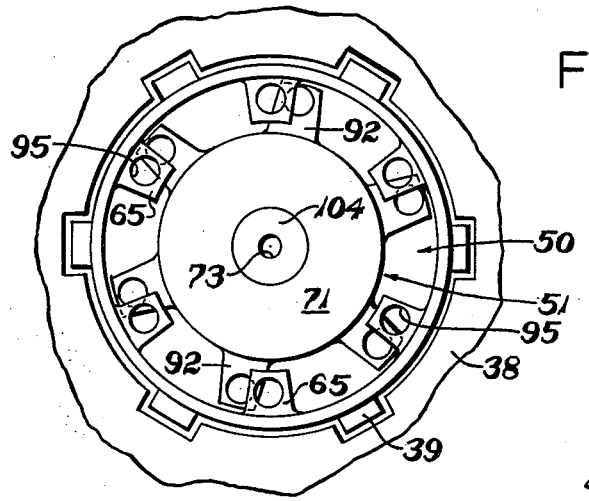
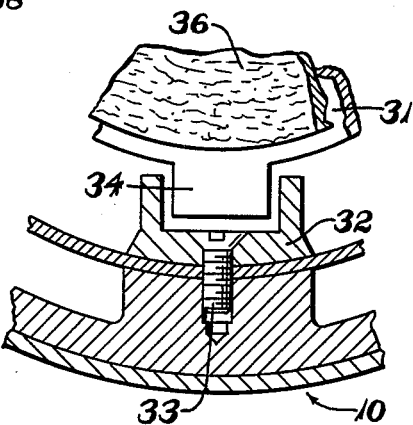
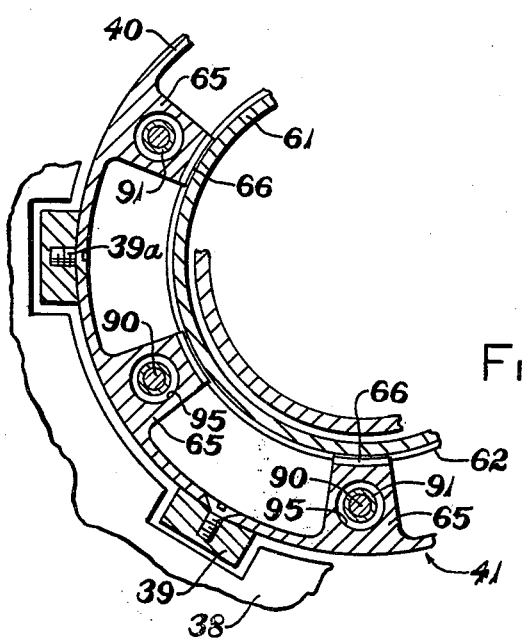

United States Patent Office 3,061,050
Patented Oct. 30, 1962

3,061,050
WHEEL AND BRAKE ASSEMBLY
Russell F. Van Horn, Tipp City, Ohio, assignor to The
B. F. Goodrich Company, New York, N.Y., a corporation of New York
Filed Sept. 3, 1958, Ser. No. 758,790
3 Claims. (Cl. 188—72)

This invention relates to an improved integral wheel and brake assembly particularly suited for high energy braking applications such as encountered in aircraft.

According to this invention, a wheel and brake assembly is provided in which substantially the entire (or at least the major proportion) of the region inside the wheel rim envelope is made available for housing a brake structure. Thus a brake mechanism of very large heat storage capacity may be incorporated inside the wheel rim without occupying any more space than that required for the wheel itself, and without causing objectionable heating of the wheel rim.

Practically the entire wheel rim envelope is made available to receive brake mechanism in an assembly according to this invention by mounting the assembly to the end of a non-rotatable stub axle (or to an equivalent non-rotatable support structure) so that the axle does not extend appreciably inside the wheel rim envelope. In the preferred construction the wheel rim is rotatably engaged near one of its circumferential margins with a non-rotatable wheel web which in turn is fastened laterally against the end of a stub axle. Preferably disc-type brake mechanism is used inside the wheel which may be located a substantial distance from the wheel rim. The brake mechanism includes a brake frame supported by the wheel web and carrying a set of non-rotatable braking members. The rotatable braking members are carried by the wheel rim but in this assembly there is adequate space to provide for shielding the surrounding wheel rim against heat radiation from the braking members.

The brake mechanism is advantageously actuated from a single fluid actuation motor located wholly inside the wheel rim envelope and preferably concentrically inside the annular disc braking members. Various forms of actuation motors may be used, the movable pressure member thereof being engaged with a fixed member on the wheel web to urge the braking discs against each other to effect the braking action. The retraction of the braking members is easily accomplished by a single central spring located inside the braking members for biasing the movable motor member toward its release position.

Because of the space available, the actuation motor members may have very large hydraulic pressure areas; hence very high braking forces may be obtained with the conventional aircraft hydraulic pressure systems. Another advantageous feature of the assembly is that a brake with only a single actuation motor is more economical to manufacture and very much easier to maintain than brakes with a number of individual actuation motors as commonly used on disc brakes wherein the space region enveloped by the wheel rim is congested by axles, bearings mounting flanges, etc. Moreover, the use of single actuating motor as provided in this invention requires a smaller volumetric displacement of fluid to actuate the brake than the volume of fluid which would be displaced in multi-motor brakes of equivalent capacity to achieve the same braking effect.

Another feature of this design is the ease which the assembly may be dismantled for maintenance and repair. In this assembly the actuation motor by itself may be serviced or replaced without removing the wheel or the braking members. Also, the wheel rim and/or the braking discs may be individually removed from the assembly for replacement or repair, independently of the remaining parts of the assembly.

A wheel and brake assembly made in accordance with and embodying this invention and which represents a preferred design is shown in the accompanying drawings:

FIG. 3 is a fragmentary view showing the manner in which the movable motor member is disengaged from the brake frame; and FIGS. 4 and 5 are fragmentary enlarged views showing various details of the mechanism, the views being taken along the lines 4—4, 5—5, respectively, of FIG. 2.

Figure 2:
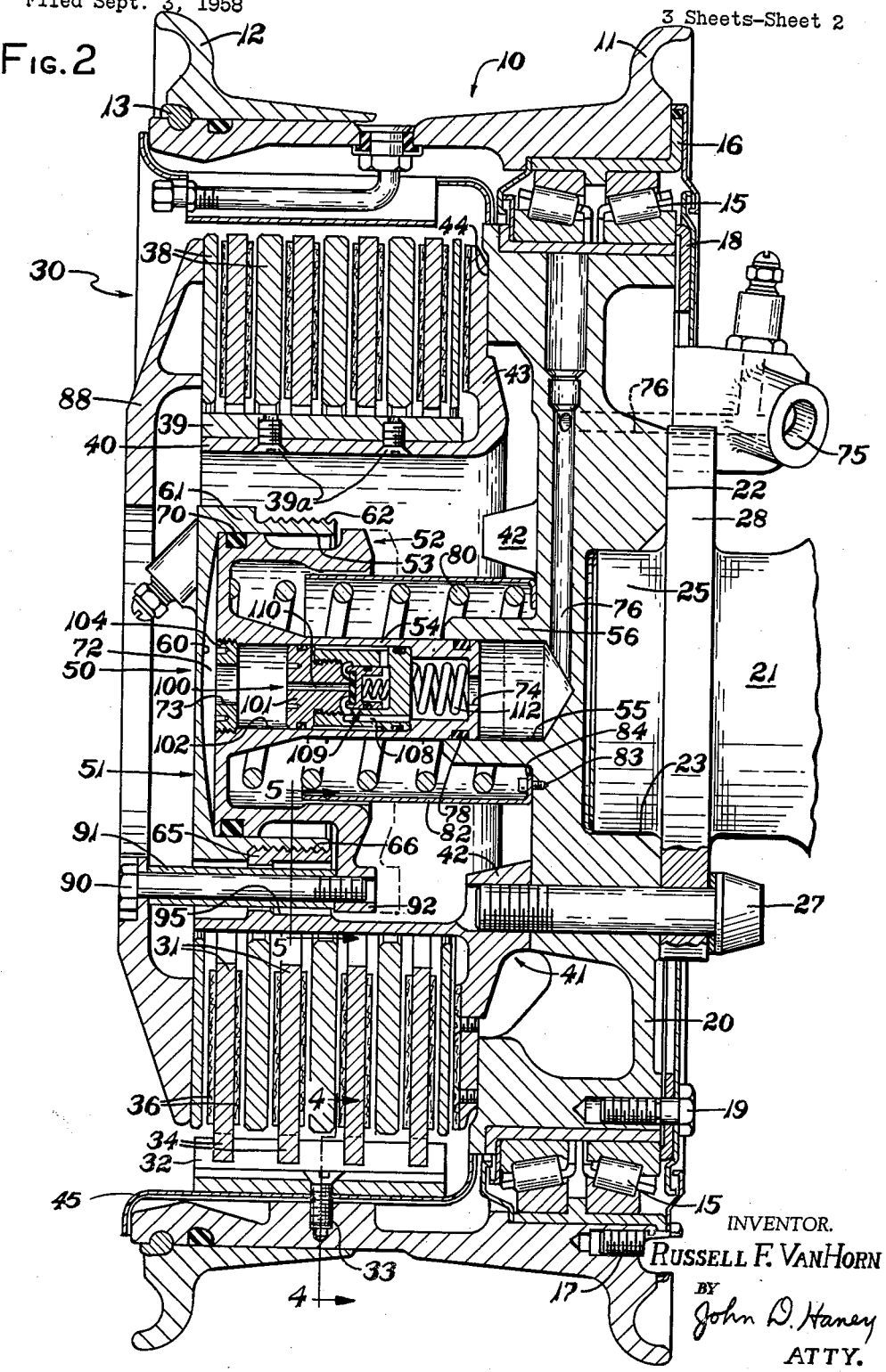
FIG. 2 is a diametrical cross sectioned view of the brake taken substantially on the line of 2—2 of FIG. 1.

Referring to FIG. 2, the wheel and brake assembly there shown includes a generally cylindrical wheel rim 10 having tire bead flanges 11 and 12 at its circumferential margins. Rim flange 12 is removable from the wheel rim to mount a tire over the rim and when positioned on the rim, flange 12 is locked in place in an annular locking ring 13.

The wheel rim 10 is supported for rotation on bearings 15 which are mounted adjacent the interior surface of the wheel rim near the right rim flange 11. The bearings 15 include an outer bearing race retainer 16 which is fastened to the wheel rim by bolts 17, and an inner bearing race retainer 18 seated on and secured to a non-rotatable wheel web 20 by bolts 21.

The wheel web 20 is an annular strength member by means of which the complete wheel and brake assembly is mounted to an axle member 21. The web member 20 completely encloses the side of the wheel rim 10 at flange 11. In the radial face 22 of web 20 there is a socket 23 in which the stub end 25 of axle 21 is snugly received. The web member 20 is anchored securely to the axle by mounting bolts 27 which fit through an integral torque flange 28 on the axle and which are threaded into the adjoining body of the web member.

Owing to the location of the bearings 15 and the manner in which the web 20 is engaged to the end of axle 21, the major proportion of the space enveloped by the wheel rim 10 is open and is available, therefore, to receive the brake mechanism 30 which is subsequently described. The side of the wheel rim 10 bounded by bead flange 12 is open to receive and to permit maintenance work on the brake members.

Figure 1:
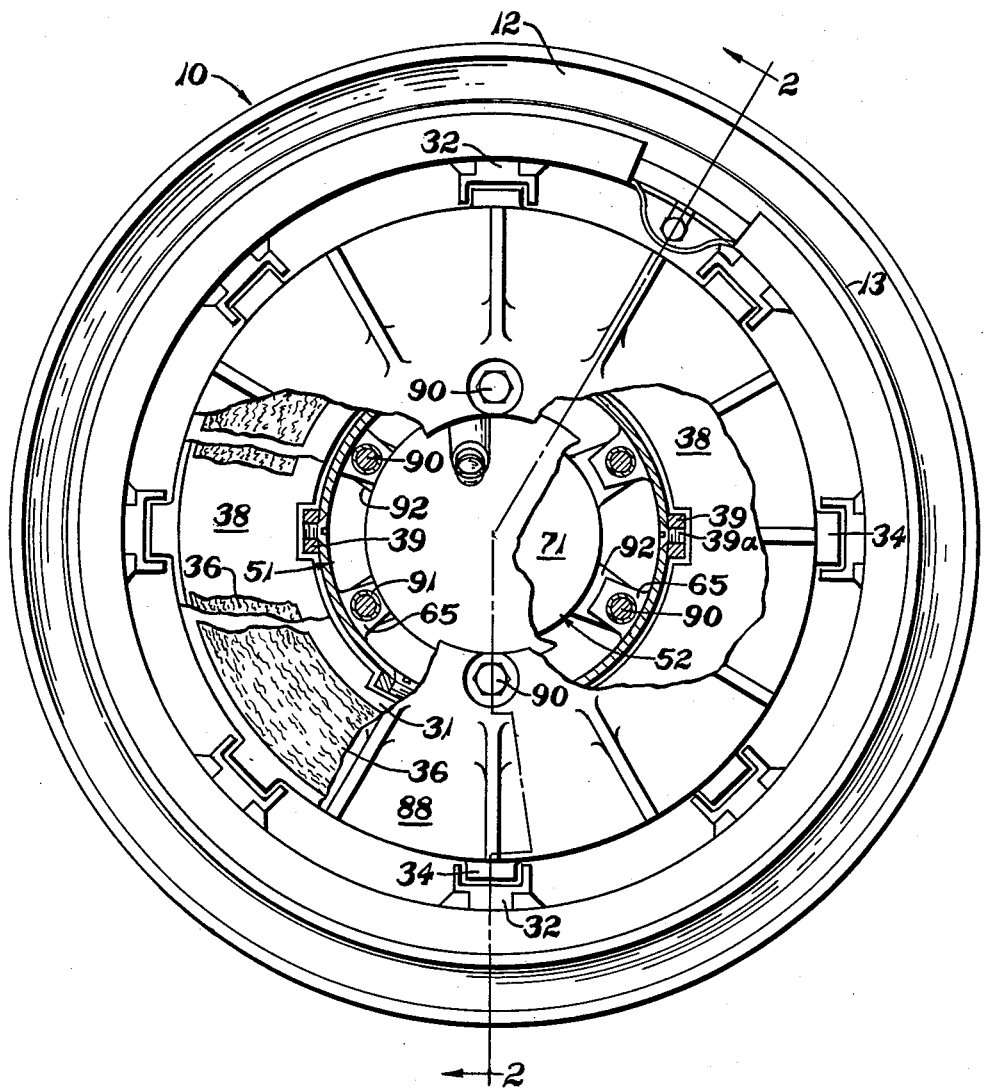
FIG. 1 is an axial elevational view of the brake mechanism looking at the side opposite the axle mounting, certain parts being broken away.

The brake mechanism 30 is a disc-type brake, having as its rotatable braking members a series of annular lining carriers 31 which are supported concentrically inside the wheel rim 10 by a series of channel-shaped lugs 32 fastened by screws 33 to the wheel rim and which engage lugs 34 (FIGS. 1 and 4) at the outer periphery of the annular lining carriers. The details of the manner in which the lining carriers are supported is best shown at the bottom of FIG. 2 and in the fragmentary FIG. 4 view. Referring to these figures, there is a series of arcuately spaced bosses 35 on the inner surface of the wheel rim 10 to which the channel-shaped lug members 32 are fastened by the screw 33 so that the channels extend in the direction axial of the wheel rim. The lugs 34 of the lining carriers fit loosely into the channel lugs 31 for slidable movement axially of the wheel.

The lining carriers 30 are preferably thin flat metal annuli having secured to their opposite radial faces a layer of friction lining material 36 which may be a sintered metal lining composition, or other lining material appropriate for the temperature and energy conditions for which the brake is intended.

The non-rotatable braking members of the brake mechanism are a set of thick annular brake discs 38 which are disposed alternately between the lining carriers 31 and which are splined for axial movement to lug members 39 (see FIGS. 2 and 5) fastened by screws 39a to a non-rotatable drum portion or sleeve 40 of a brake frame member 41. The brake frame member 41 is mounted on web 20 so that its drum portion 40 is positioned concentrically inside the wheel rim 10. The frame member 41 is fastened to the web by means of lugs 42 (lower center, FIG. 2) into which the inner ends of the mounting bolts 27 are threaded as shown in FIG. 2. There are a series of lugs 42 in arcuately spaced positions around the mounting flange which abut the inside face of the web member 20 in the manner shown for the single lug member 42 in FIG. 2.

The brake member 41 further includes an annular anvil portion 43 which extends radially outward from the inner edge of the drum 40 and against which the discs and lining carriers are urged when the brake is actuated. To strengthen the anvil portion 43 of the brake frame in this design, the back of the anvil abuts the radial outer face portions 44 of the web 20 so that the anvil portion 43 may be made quite light and still will have adequate resistance to deflection when the discs and lining carriers are urged against it in braking engagement.

In view of the non-crowded conditions and the relatively large space inside the wheel rim 10, the braking areas (that is, the radial extent) of the brake discs 38 and the lining 36 may be quite large to give the brake a large braking capacity. To minimize transfer of heat to the wheel rim by radiation from the brake members 31 and 38, a thin metal cup-shaped shield 45 fits inside the open end of the rim and is fastened by lug screws 33.

The brake mechanism 30 includes a fluid pressure actuation motor 50 which is located substantially at the axial center of the wheel rim 10 entirely inside the drum portion 40 of the brake frame 41. The motor 50 includes two major components: a fixed motor member 51 secured rigidly to the brake frame 41 as hereinafter described, and a movable brake member 52 which is slidable in a bore 53 in member 51. The movable brake member 52 includes a tubular shank portion 54 which is slidable in a bore 55 in a boss 56 at the radial center of the inside surface of web 20.

The fixed motor member 51 is a hollow cap-like member having a closed end wall 60 and an annular skirt 61 which has external thread 62 formed thereon (see FIGS. 2 and 5). The fixed member 51 is fastened to the drum portion 40 of the brake member by the engagement of its thread 62 with a series of radially inwardly directed lugs 65 best shown in FIG. 5. The lugs 65 in FIG. 5 have their radially inner surfaces 66 curved at an equal radius from the axial center of the drum portion 40. These curved surfaces 66 are threaded so that they collectively form a discontinuous nut into which the external continuous threads 62 of the fixed member 51 may be screwed to fasten the member 51 securely to member 40.

The movable piston member 52 is sealed by an O-ring 70 (FIG. 2) to engage the bore 53 of the fixed member 51. A head portion 71 of member 52 defines with the opposing wall 60 of member 51 a pressure chamber 72 into which fluid may be introduced to displace member 52 and thereby actuate the brake. Fluid is supplied to the chamber 72 through the hollow shank portion 54 of member 52 and through openings 73 and 74 at the opposing ends of this shank. The hydraulic fluid pressure source (not shown) to operate this motor is connected through an inlet connection 75 on the outside surface of web 20 and is communicated through ports 76 formed through the web member into bore 55 in which the shank 54 is slidably engaged and sealed by an O-ring 78. The fluid pressure source, therefore, is communicated to chamber 72 via fitting 75, port 76, bore 55, opening 74 and opening 73.

The resulting force of the hydraulic pressure so introduced into chamber 72 acts against the peripheral face portion 71 and thus urges member 52 rightward in FIG. 2 toward the web member 20 against the opposition of a retractor spring 80 which biases member 52 away from web member 20. The retractor spring 80 preferably externally surrounds the boss 56 and shank 54 and it is protected by a cylindrical sleeve enclosure 82 fastened by screws 83 through end flanges 84 to web member 20.

The displacement of the member 52 in response to such fluid pressure is utilized to effect the axial engagement of the lining carriers 31 and brake discs 38 through an annular pressure member 88 at the open end of the wheel rim 10. Pressure member 88 is connected rigidly to member 52 by tie bolts 90 inside spacers 91 and which are threaded into lugs 92 projecting radially outwardly from member 52 around the open rim of member 51 as shown in FIG. 2. Between member 88 and lugs 92, the bolts 90 and the surrounding spacers 91 extend through openings 95 in the radial lugs 65 inside drum member 40 (see FIG. 5). Consequently, as member 52 is urged toward web member 20, the lugs 92 draw the bolts 90 and spacers 91 axially through the holes 95 also toward the web member 20 and thereby force the peripheral outer portions of the pressure member 88 against the adjoining lining carrier 31. In this manner the lining carriers and the intervening discs are pushed axially along their respective splines until they are pressed tightly one against the other and against anvil member 43. Upon release of pressure in chamber 72 the expansion of the retractor spring 80 displaces pressure member 88 axially away from web member 20 to release the braking pressure.

The radial lugs 92 on the movable member 52 are arranged at the same spacing as the lugs 65 and, as shown in FIG. 2, lugs 92 fit behind the lugs 65 between them and the web member 20. To remove the member 52 from the assembly, first the pressure member 88 is removed by unthreading bolts 90. Then the fixed member 51 is unscrewed from the lugs 65. Then the member 52 is rotated to displace its lugs 92 out of registry with the lugs 65 as indicated in FIG. 3, and then the member 52 may be simply pulled axially to withdraw its shank 54 from bore 55 of the web member.

The fluid actuating motor 50 of this assembly additionally includes a mechanism 100 for automatically adjusting the volume of fluid admitted to the actuation or expansion chamber 72 to compensate for slack in the braking members. The mechanism 100 is shown housed inside the hollow shank 54 of the movable member 52 and this mechanism is designed to compensate both for permanent slack such as wear on the brake members and also for transient slack such as slack caused by deflection and resulting spring back of the pressure member 88 of the remaining parts of the mechanism. In this sense the mechanism is a "two-way adjuster" and an explanation of its operation may be found in detail by reference to a copending application of B. W. Oswalt, Serial No. 692,636, filed October 28, 1957, now Patent No. 2,918,797.

In general, the mechanism 100 has a floating piston assembly 101 which is slidable in a bore 102 inside the forward portion of shank 54. When the brake is actuated, the fluid pressure introduced into bore 55 acts through port 74 against the rearward end of the piston assembly 101 and displaces it forwardly toward a stop ring 104 fixed at the mouth of bore 102 opening into chamber 72. The fluid within the bore 102 in front of the floating piston assembly is thus displaced into chamber 72 through opening 73. As soon as the front of the piston assembly engages ring 104, the inlet pressure is communicated from bore 55 through a port 108 to a small poppet valve 109 inside the floating piston assembly which thereupon opens to permit additional flow of fluid into chamber 72 through a passage 110, if such flow is needed. Note that the floating piston 101 moves in a direction counter to the movement of shank 54 when the brake is actuated.

Poppet valve 109 stands open throughout the period the brake is engaged so that expansion chamber 72 has a direct connection to the supply line at fitting 75.

On release of pressure to disengage the brake, the poppet valve 109 immediately snaps shut and traps the fluid then in chamber 72 in front of the floating piston assembly. Then the floating piston assembly 101 is retracted to return it to the position shown in FIG. 2 by the expansion force of the retractor spring 80.

The displacement volume of the floating piston assembly 101 is designed so that it is proportional for the axial movement required for the pressure 88 to effect braking engagement. Hence full pressure is normally applied by the time the floating piston 101 bottoms against ring 104. If through the dissipation of transient slack, etc. the braking engagement occurs before the floating piston assembly 101 bottoms, then poppet valve 109 will be forced open by the incoming fluid pressure through passage 108 and thereafter a main spring 112 will urge the floating piston assembly forward until it does bottom against the ring, the excess fluid flowing backward through the passages 110 and 108 as the result of this movement of the spring. By this action the adjusting mechanism 100 at all times is able to maintain and meter to or from chamber 72 the exact volume of fluid required to maintain a uniform release clearance of pressure member 88. regardless of the wear which may have occurred in the lining member 36, or the extent to which the pressure member 88 may have been deflected by a high energy braking engagement.

Other forms of actuation members may be used within the scope of this invention in lieu of that shown and other variants of the construction may be made within the scope of the appended claims.

I claim:

1. A wheel and brake assembly comprising a non-rotatable wheel web adapted for mounting rigidly against an axle end, a wheel rim rotatably mounted on said wheel web, the wheel rim projecting axially from said web to an open side directed away from an axle to which said web is mounted, a sleeve fastened to said web and extending concentrically of said rim and terminating in an open end near said open side of the rim, a non-rotatable brake member carried on the outside of said sleeve and a rotatable brake member carried on the inside of said wheel rim for engagement with the non-rotatable brake member, a first brake actuating motor member removably fastened to said open end of said sleeve, a movable motor member inside said sleeve slidably engaged with the aforesaid first motor member for movement axially of the rim, a spider at the open side of said rim extending from a location near said open end of said sleeve to a location adjacent said braking members, means accessible at said open side of the rim for removably connecting said spider to said movable brake motor member, means biasing said movable motor member toward said first motor member to urge said spider to a position in which said braking members are disengaged, and means for introducing fluid pressure force between said first motor member and said movable motor member to shift the latter axially toward said web and thereby cause the spider to engage the brake members with each other.

2. An assembly according to claim 1 wherein said sleeve has a set of inwardly directed radial lugs terminating at their innermost portions in a threaded region on a common radius about the wheel axle, and wherein said first motor member is in threaded engagement with said regions of the lugs, and wherein said movable motor member is slidably engaged with a central bore of said fixed member, and the movable member having radial lugs overlapping aforesaid sleeve lugs, said means connecting said movable member with said spider being engaged with the latter said lugs and extending slidably through the lugs of said sleeve member to said spider.

3. A wheel and brake assembly comprising a non-rotatable wheel web adapted for mounting rigidly against a stub axle end, a wheel rim having outwardly directed tire bead flanges at the opposing circumferential margins thereof, the wheel rim concentrically embracing said wheel web and being mounted on said web for rotation at a location on the inner periphery of said wheel rim adjacent one of said rim flanges and disposed so that the wheel rim extends axially to an open side directed away from the axle-engaging portions of the web and an axle connected thereto, a series of lug members on the inner periphery of the wheel rim and extending axially of the wheel, a set of annular braking members having their outer periphery engaged with said lugs and disposed concentrically of the wheel rim with radially disposed opposing annular braking faces wholly within the envelope of the wheel rim for rotation with the wheel, said rotatable members being in axial slidable engagement with said lugs, a non-rotatable brake frame fixed to said web within the envelope of the wheel rim and including a sleeve extending concentrically of the wheel rim and inside the inner periphery of said rotatable braking members and having an open end directed away from said web and an anvil portion extending radially of the wheel rim close to said web and generally parallel said rotatable braking members, a set of non-rotatable braking members carried on the outside of said sleeve and interposed alternately between said rotatable brake members in axial slidable engagement with said sleeve, said brake frame including a fixed motor member engaged with said sleeve inside said open end thereof, and a movable motor member slidably engaged with said web portion and said fixed motor member, means for biasing said movable motor member away from said web member, said movable motor member and said fixed motor member cooperating to define between them a fluid chamber into which actuation fluid may be introduced to effect displacement of said movable member against said biasing means, and a non-rotatable pressure member at said open side of the rim engaged with said movable motor member and extending radially therefrom to a location at said open side of the rim adjacent one of said sets of braking members, said pressure member being displaceable to press said sets of braking members one against the other and against said anvil member in response to said fluid actuation of said movable member, and means accessible at said open side of the wheel for removably connecting said pressure member to the movable member of said brake motor.

References Cited in the file of this patent

UNITED STATES PATENTS

| 2,124,469 | Peterman | July 19, 1938 |
| 2,523,598 | Smith | Sept. 26, 1950 |
| 2,616,525 | Du Bois | Nov. 4, 1952 |
| 2,875,855 | Albright | Mar. 3, 1959 |

FOREIGN PATENTS

| 265,650 | Great Britain | Feb. 9, 1927 |